(12) United States Patent
Iellamo

(10) Patent No.: US 11,984,912 B2
(45) Date of Patent: May 14, 2024

(54) METHOD FOR PROVIDING MOBILE RADIO CONNECTIVITY IN A CONFINED SPACE BY MEANS OF AN EXTERNAL AERIAL AND ASSOCIATED SYSTEM

(71) Applicant: Institut Mines Telecom, Palaiseau (FR)

(72) Inventor: Stefano Iellamo, Paris (FR)

(73) Assignee: Institut Mines Telecom, Palaiseau (FR)

( * ) Notice: Subject to any disclaimer, the term of this patent is extended or adjusted under 35 U.S.C. 154(b) by 212 days.

(21) Appl. No.: 17/415,076

(22) PCT Filed: Dec. 16, 2019

(86) PCT No.: PCT/EP2019/085402
§ 371 (c)(1),
(2) Date: Jun. 17, 2021

(87) PCT Pub. No.: WO2020/127084
PCT Pub. Date: Jun. 25, 2020

(65) Prior Publication Data
US 2022/0045700 A1      Feb. 10, 2022

(30) Foreign Application Priority Data
Dec. 21, 2018   (FR) ..................................... 1873768

(51) Int. Cl.
*H04B 1/00*      (2006.01)
*H04B 7/155*     (2006.01)

(52) U.S. Cl.
CPC ....... *H04B 1/0064* (2013.01); *H04B 7/15514* (2013.01)

(58) Field of Classification Search
CPC ..... H04B 1/0064; H04B 7/15514; H04B 1/38
See application file for complete search history.

(56) References Cited

U.S. PATENT DOCUMENTS

| 4,851,830 A * | 7/1989 | Andros ..................... G08B 5/22 |
| | | 340/7.25 |
| 5,809,398 A * | 9/1998 | Moberg ............. H04B 7/15542 |
| | | 455/22 |

(Continued)

FOREIGN PATENT DOCUMENTS

| EP | 1865621 A1 * | 12/2007 | ......... H04B 7/15514 |
| EP | 1865621 A1   | 12/2007 | |

(Continued)

OTHER PUBLICATIONS

International Search Report for PCT/EP2019/085402 (ISA/EP) dated Feb. 10, 2020.

*Primary Examiner* — Ayaz R Sheikh
*Assistant Examiner* — Tarell A Hampton
(74) *Attorney, Agent, or Firm* — Alston & Bird LLP

(57) ABSTRACT

On the downlink, a mobile radio signal transmitted by a base station and a television signal may be received over the downlink by an external television aerial located on a building roof. After reception, these signals may be transmitted via a wired communication link to a processing module located in a confined space in which the terminal is located. The mobile radio signal may be extracted, amplified and sent by the processing module so as to be received by the terminal. On the downlink, the terminal may transmit a mobile radio signal to a base station. Alternatively, the terminal may transmit a radiofrequency signal received by the processing module which amplifies it and transmits it to a base station, with or without frequency transposition, and with or without format conversion.

21 Claims, 7 Drawing Sheets

(56) References Cited

U.S. PATENT DOCUMENTS

| | | | |
|---|---|---|---|
| 8,396,508 B2* | 3/2013 | van Rooyen | H04H 40/18 455/562.1 |
| 8,660,169 B1* | 2/2014 | Karabinis | H04W 12/04 455/73 |
| 2002/0059615 A1* | 5/2002 | Okawara | H04W 16/00 725/78 |
| 2004/0063425 A1* | 4/2004 | Wakutsu | H04B 1/0003 455/418 |
| 2005/0030915 A1 | 2/2005 | Golombek et al. | |
| 2006/0130099 A1* | 6/2006 | Rooyen | H04N 21/4183 725/62 |
| 2006/0130101 A1* | 6/2006 | Wessel van Rooyen | H04B 1/0057 725/100 |
| 2007/0184813 A1* | 8/2007 | Pascht | H04B 1/406 455/349 |
| 2012/0034912 A1* | 2/2012 | Kamdar | H04N 7/20 455/425 |
| 2012/0042345 A1* | 2/2012 | Tjio | H04L 12/2801 725/127 |
| 2012/0120837 A1* | 5/2012 | Rofougaran | H04W 88/04 370/252 |
| 2014/0135061 A1* | 5/2014 | Rousu | H04B 1/401 455/553.1 |
| 2015/0156713 A1* | 6/2015 | Song | H04W 48/20 455/434 |
| 2016/0095002 A1* | 3/2016 | Zhan | H04B 1/005 370/294 |
| 2016/0294441 A1* | 10/2016 | Fazlollahi | H04L 5/0023 |
| 2019/0253129 A1* | 8/2019 | Pyun | H04B 3/36 |
| 2020/0028568 A1* | 1/2020 | Zhan | H04L 5/14 |
| 2022/0045700 A1* | 2/2022 | Iellamo | H04B 1/0064 |

FOREIGN PATENT DOCUMENTS

| | | | | |
|---|---|---|---|---|
| EP | 2063549 A1 | | 5/2009 | |
| EP | 2816868 A1 | * | 12/2014 | ......... H04B 7/15514 |
| EP | 2760249 B1 | * | 10/2019 | ......... H04W 88/181 |
| WO | WO-03051074 A1 | * | 6/2003 | ......... H04B 7/18523 |
| WO | WO-2016095999 A1 | * | 6/2016 | |

* cited by examiner

METHOD FOR PROVIDING MOBILE RADIO CONNECTIVITY IN A CONFINED SPACE BY MEANS OF AN EXTERNAL AERIAL AND ASSOCIATED SYSTEM

CROSS-REFERENCE TO RELATED APPLICATIONS

This application is a national stage application filed under 35 U.S.C. § 371 of International Application No. PCT/EP2019/085402 filed Dec. 16, 2019, which application claims priority to French Patent Application No. 1873768, filed Dec. 21, 2018, each of the foregoing applications is hereby incorporated by reference in its entirety.

TECHNICAL FIELD OF THE INVENTION

The invention relates to a method of providing a mobile-radio connectivity within a constrained space, such as a building or a home.

The invention has a privileged application for allowing mobile terminals located within confined or constrained spaces to communicate with external mobile-radio networks, in particular of the 4G (4th Generation) type according to the LTE (Long Term Evolution) and/or 5G (5th Generation) standard.

In particular, the invention can operate simultaneously with 4G-LTE base stations and 5G-NR (New Radio) base stations according to the dual connectivity mode (UTRA-NR Dual Connectivity) as defined in the 3GPP standard.

However, the invention does not only apply to 4G and/or 5G type networks but more generally to any type of mobile-radio network operating in the ranges of the UHF frequencies (Ultra High Frequency). These so-called "ultra-high" frequencies are generally between 300 MHz and 3 GHz, in particular between 300 MHz and 1 GHz and more particularly between 450 MHz and 960 MHz.

Hereafter, the term terminal will refer to any communicating device—such as a PC (Personal Computer), a mobile phone or a smartphone, a tablet or any type of connected object—compatible with the 4G-LTE and/or 5G-NR (New Radio) and/or Wi-Fi communication standard.

It is understood that a space has a mobile-radio connectivity when it has sufficient radiofrequency coverage to allow a terminal to access a mobile-radio communication network.

The radiofrequency coverage is estimated in particular as a function of the average radiofrequency power of the signal received at the working frequency, expressed in dBm, in relation to a reference threshold.

According to statistical data from mobile-radio operators, about 80% of the mobile data traffic is currently consumed inside buildings (e.g. housing, offices, shopping centers, railway stations, etc.). However, the quality of mobile-radio signals received by the mobile terminals inside these constrained or confined spaces can be severely degraded, in particular because of the attenuation or the reflection of the radiofrequency waves caused by the structure of the buildings themselves.

Due to the difficult or non-existent penetration of these mobile-radio signals inside the buildings, the indoor space does not have radiofrequency coverage that can provide an access to a mobile-radio communication network (i.e. lack of mobile-radio connectivity).

In the case where the access to the mobile-radio network is possible, connectivity is often very unsatisfactory (i.e. accessibility rate too low), in the sense that it does not allow a terminal user to communicate in good conditions (e.g. data download, real-time audio/video communication).

BACKGROUND

This situation leads mobile-radio operators to increase the emission power of the mobile-radio signals emitted by the base stations of mobile-radio networks and/or to increase the density of deployed base stations.

However, this approach is disadvantageous, as the modifications to the networks are costly and increase their complexity and energy consumption (e.g. installation of new equipment to be powered and maintained).

Moreover, this approach is not desirable because it contributes to increase the level of electromagnetic pollution and the exposure of users to the electromagnetic waves, in particular in the vicinity of the base stations.

In view of these various disadvantages, radiofrequency communication systems known as small cells and radio relays have been proposed. This approach consists of distributing repeaters or radiofrequency relays with low radio power inside the buildings, in order to increase the density of coverage cells.

There are also femtocell or picocell systems on the market that are configured to dynamically adjust the power and the frequency of the signals emitted to the mobile terminals.

However, such systems are not satisfactory in particular for the following reasons.

In terms of performance, the gain in transmission rates provided by these systems remains low, and the interference management remains difficult to implement.

From an energy point of view, the power supply of all the picocell or femtocell relays can make the system very energy consuming, despite the implementation of a standby mechanism for the inactive cells.

Finally, the installation and the maintenance of the relays are very constraining for the mobile-radio operators.

In addition, the mobile-radio operators have been required to acquire licenses to operate in sub-GHz frequency bands to provide a basic coverage inside the buildings. However, the acquisition of such frequency bands is currently negotiated at prohibitive prices.

SUMMARY OF THE INVENTION

One objective of the invention is to overcome at least one of the above-mentioned disadvantages.

To this end, the invention proposes a method of communication between at least one base station of a mobile-radio network, preferably of the LTE and/or 5G type, and at least one terminal located in a confined space, said method comprising the following steps: a) receiving by at least one television aerial external to said confined space, in a UHF frequency band, in particular between 450 MHz and 960 MHz, a plurality of radiofrequency signals comprising, on the one hand, at least one mobile-radio signal emitted by said at least one base station of the mobile-radio network, preferably in accordance with the LTE and/or 5G standard, and comprising on the other hand one television signal; b) transmitting said plurality of radiofrequency signals, via a wired communication link, between said at least one external television aerial and a processing module of the radiofrequency signals, this processing module being located within said confined space; c) extracting said at least one mobile-radio signal by the processing module; d) broadcasting said at least one mobile-radio signal extracted by said processing module within the confined space and e) receiving said broadcast signal by the terminal.

On the downlink (i.e. from the base station to the terminal), the broadcasting of the mobile-radio signal received from the base station by means of said at least one external aerial by the processing module advantageously allows to improve the connectivity to the mobile-radio network for a terminal located inside the confined space. Preferably, a LTE and/or 5G connectivity can be advantageously provided to a terminal located within the confined space.

According to an embodiment of the invention, the method further comprises, between step c) and step d), a frequency transposition step, according to which said at least one extracted mobile-radio signal is transposed to a frequency different from that at which said mobile-radio signal was received, so as to provide at least one frequency-transposed signal, said transposition step being carried out by said processing module.

The frequency conversion advantageously allows the mobile-radio signal to be transposed into another frequency band, for example among the frequency bands allocated to 4G/5G transmissions.

According to another embodiment of the invention, the method further comprises, between step c) and step d), a conversion step, during which said at least one extracted mobile-radio signal is converted according to a specific standard so as to provide at least one converted signal, the conversion step being performed by the processing module.

In this way, the radio coverage can be suited to the preferences and/or the communication capabilities of the terminal located in the confined space. In particular, a wireless coverage, for example of the Wi-Fi type, more suitable for the indoor communications can advantageously be provided to the terminal from the 4G/5G mobile-radio signals received according to the 4G/5G standard via said at least one external television aerial.

According to another embodiment of the invention, the method further comprises, between step c) and step d), an amplification step, during which said at least one extracted mobile-radio signal is amplified by the processing module.

According to another embodiment of the invention, the method also comprises the following steps: e) a step of emitting a mobile-radio signal by the terminal to at least one base station of the mobile-radio network, f) a step of receiving by the base station the radiofrequency signal emitted by the terminal.

According to another embodiment of the invention, the method also comprises: g) a step of intercepting by the processing module a radiofrequency signal transmitted by the terminal; h) a step of emitting by said processing module a radiofrequency signal obtained from the radiofrequency signal received from the terminal, to said at least one base station of the mobile-radio network; and i) a step of receiving by the base station the radiofrequency signal emitted by the processing module.

According to another embodiment of the invention, the method further comprises, between step g) and step h), an amplification step, during which the received radiofrequency signal is amplified by the processing module.

According to another embodiment of the invention, the method further comprises, between step g) and step h), a frequency transposition step, during which the received radiofrequency signal is transposed to a frequency different from that at which the radiofrequency signal was received, the transposition step being carried out by the processing module.

According to another embodiment of the invention, the method further comprises a conversion step, during which the received radiofrequency signal is converted by the processing module according to the LTE and/or 5G standard.

According to another embodiment of the invention, the frequency at which said at least one signal is transposed is dynamically allocated by the processing module.

According to another embodiment of the invention, the amplification is carried out dynamically by the processing module.

The invention also relates to a system for carrying out the method as described above, the system comprising: at least one base station of a mobile-radio network, said at least one base station being able to emit and/or receive mobile-radio signals; at least one television aerial external to a confined space, said at least one aerial being able to receive radiofrequency signals in a UHF frequency band, in particular between 450 MHz and 960 MHz; a module for processing radiofrequency signals, the processing module being installed in the confined space and comprising an extraction means suited to extract at least one mobile-radio signal among the radiofrequency signals in said frequency band as well as an aerial suited to emit and/or receive a radiofrequency signal; a wired communication link connecting the television aerial external to said processing module; at least one terminal capable of receiving and/or emitting at least one radiofrequency signal from or to said processing module, said at least one terminal being located in the confined space.

According to an embodiment of the invention, the extraction means suited to extract at least one mobile-radio signal among the radiofrequency signals of said frequency band is selected from: at least one diplexer, one triplexer, one quadplexer or a combination thereof.

According to an embodiment of the invention, the extraction means is a diplexer.

According to an embodiment of the invention, the extraction means comprises: —a splitting stage including an input port and n output ports, said splitting stage being configured to frequentially split the signals received from the external aerial on the output ports; —a combining stage comprising at least one component including m<n input ports and one output port, each input port of said at least one component being connected to a separate output port of the splitting stage so as to frequentially combine a plurality of signals received from the external aerial on a same output port of the combining stage.

According to an embodiment of the invention, the splitting stage comprises a triplexer and the combining stage comprises a diplexer.

According to an embodiment of the invention, the splitting stage comprises a 1:4 quadplexer and the combining stage comprises two 2:1 diplexers.

According to an embodiment of the invention, the processing module comprises at least one power amplifier and/or at least one low noise amplifier suited to amplify the mobile-radio signal received from at least one of said base stations.

According to an embodiment of the invention, the processing module comprises frequency transposition means suited to provide at least one frequency-transposed signal from said mobile-radio signal received from at least one of said base stations.

According to an embodiment of the invention, the processing module further comprises signal processing means configured to convert the mobile-radio signal received from at least one of said base stations to a given standard.

According to an embodiment of the invention, the processing module is implemented at least in part according to a software radio technology.

Thus, within the scope of the invention, it is proposed to exploit existing television aerials initially intended for the reception of television signals in the UHF (Ultra High Frequency) frequency bands for the reception of mobile-radio signals, in particular of the LTE type and/or of the 5G type, in a frequency band between 450 and 960 MHz.

Currently, the LTE/5G n°8 frequency band reaches the maximum frequency of 960 MHz. The lowest LTE frequency is 450 MHz while the lowest frequency common to both LTE and 5G standards is 617 MHz in the n°71 frequency band. It should be noted that the frequencies operational under the 5G standard in the frequency range FR1 (Frequency Range 1) are a subset of the frequencies used under the LTE standard. However, other operational frequency bands with specific channel bandwidths may be used in accordance with the future publication of the 3GPP (3rd Generation Partnership Project), e.g. according to the technical specifications 3GPP TS 38.101-1.

In particular, it involves the use of at least one external television aerial on the roof of a building to receive the LTE and/or 5G signals emitted from a base station to the mobile terminals located inside the building.

BRIEF DESCRIPTION OF FIGURES

Other particularities and advantages of the invention will become apparent from the following description, in relation with the attached drawings, which are given as non-limiting examples.

DETAILED DESCRIPTION OF THE INVENTION

The general principle of the invention is to operate television aerials on the roofs of buildings or houses to improve the mobile-radio coverage inside the buildings.

The aim is to improve the mobile-radio connectivity, in particular of the 4G and/or 5G type, in UHF frequency bands, in particular between 450 MHz and 960 MHz, and thus to contribute to providing very high speed wireless Internet access inside buildings with improved performance compared to that provided by the previously described prior art solutions.

Figure 1:
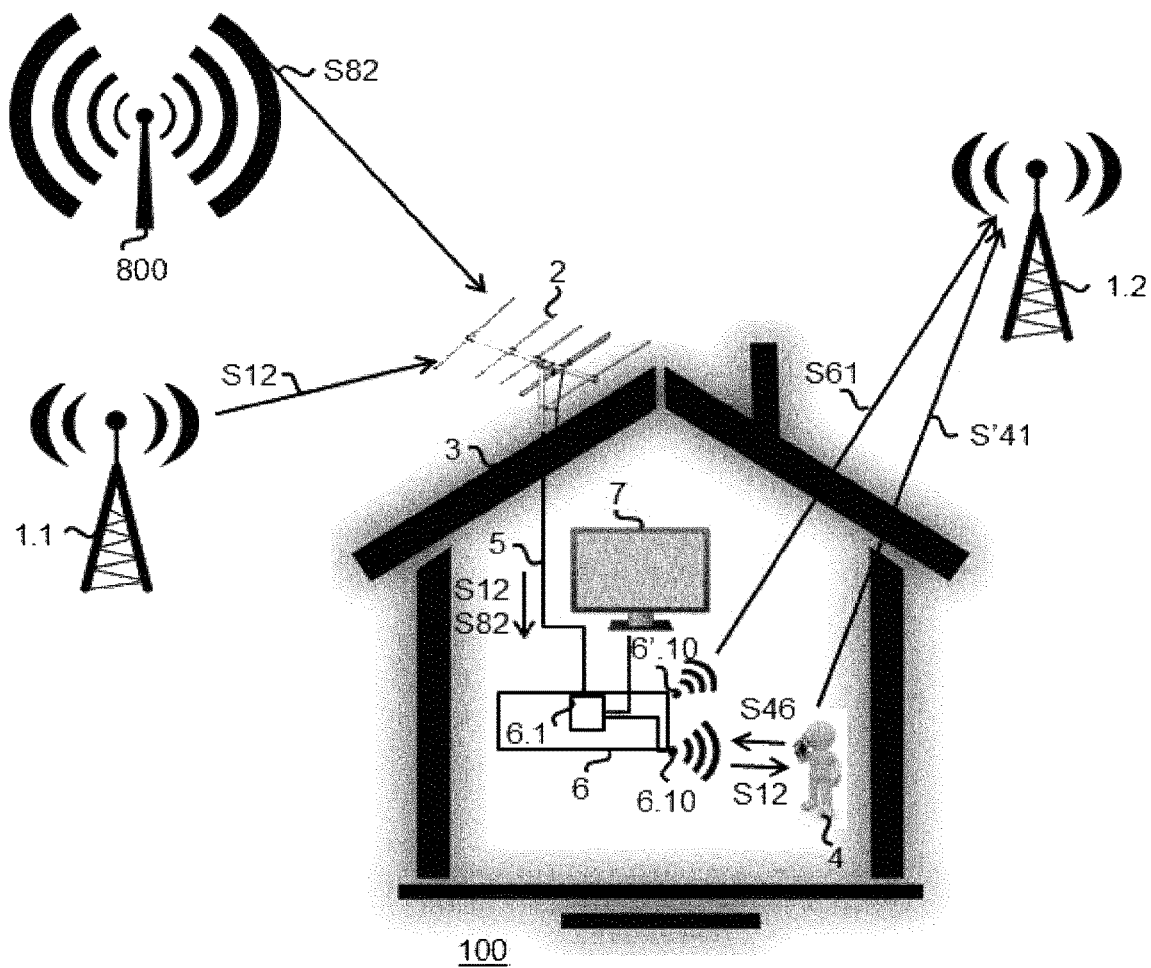
FIG. 1 illustrates an embodiment of the system according to the invention for a bi-directional communication between base stations and a terminal located inside a building.

As illustrated in FIG. 1, the system 100 for implementing the communication method according to the invention comprises a plurality of base stations 1.1, 1.2 belonging to a same mobile-radio network. Each base station is capable of emitting and/or receiving mobile-radio signals, in particular according to the LTE and/or 5G standard.

The base stations considered in the present embodiment are fixed. However, in alternative embodiments, the base station or the base stations may be mobile so as to maximize the potential of the present invention. For example, they could be embedded on a vehicle (UAV: Unmanned Aerial Vehicle), such as a drone, the drone serving as a base station will be able to move in such a way as to optimize the conditions for receiving a mobile-radio signal according to the principle of the invention.

The system 100 further comprises a television aerial 2 referred to as a TV aerial. This aerial is said to be external with respect to a confined space, such as an indoor space in a house 3, where the LTE and/or 5G connectivity is assumed to be low or non-existent. A terminal 4 wishing to communicate with the base stations 1.1, 1.2 is located in this indoor space.

According to FIG. 1, two base stations 1.1, 1.2 have been considered. For example, it is assumed that the first base station 1.1 is closest to the terminal 4, in the direction in which the external television aerial 2 points, so as to receive a mobile-radio signal S12. It can also be assumed that the second base station 1.2 is closest to the terminal 4 but is not located within the range of visibility of the external TV aerial 2, so that the aerial does not receive a mobile-radio signal from this second base station 1.2. However, in other cases, a single base station may be considered sufficient if it is close enough to receive a signal emitted on the uplink in the case of a two-way communication.

For example, the external aerial 2 is previously installed on the roof of the house 3, so as to receive television signals S82 emitted by an emitting television station 800.

In a known way, the bandwidth of the external television aerial 2 is between 450 MHz and 960 MHz in reception to receive the television signals S82.

The external television aerial 2 may consist of one or more aerials suited to receive television channels in the so-called UHF frequency range. For example, the external television aerial 2 may be a single broadband television aerial or a group of aerials. Such an aerial array or grouping usually has significantly better performance (e.g. higher gains and directivity) in their smaller frequency range.

According to the principle of the invention, the external television aerial 2 (i.e. at least one single aerial or a set of grouped aerials) is advantageously used to receive mobile-radio signals from one and/or more base stations 1.1, in particular of the LTE and/or 5G type, for example, in a frequency band between 450 MHz and 960 MHz. Thus, the reception band of the mobile-radio signals is included in the bandwidth of the external television aerial 2.

The frequency range used for reception depends mainly on the aerial model concerned. For example, in France, the frequencies used by conventional rooftop wideband TV receiving aerials designed prior to the introduction of digital television transmission are generally between 450 MHz and 960 MHz, and more specifically between 470 MHz and 865 MHz. In Italy, these frequencies are generally between 470 MHz and 960 MHz to allow for the allocation of 70 to 81 television channels. In this case, high bandwidth television aerials are used.

In practice, operational margins are generally applied in the design of the television aerials so that their reception bandwidth is generally between 450 MHz and 960 MHz in any given country, in order to cover all the television channels internationally and all the frequencies used in the LTE standard.

Preferably, the external television aerial 2 is of the Yagi or Log periodic type. These aerials have the advantage of a high gain and directivity. Thus, these aerials advantageously allow to obtain a high gain for the mobile-radio signal, in the direction in which the aerial is oriented.

Typically, the television aerials of Yagi type currently in place on the roofs of the housing in France have gains of the order of 11 dB to 15 dB in their frequency band, with an opening of 30° at 3 dB.

Thus, according to the principle of the invention, the external television aerial 2 is advantageously used to pick up the mobile-radio signals, for example LTE and/or 5G, emitted by the base station 1.1 closest to the terminal 4, in the direction in which said aerial 2 points.

The gain provided by the external television aerial 2 is a first improvement factor to increase the quality of the mobile-radio signal received inside the building. Therefore, the gain of the external television aerial 2 has the effect of improving the mobile-radio connectivity and maximizing the mobile-radio transmission rates inside the buildings, i.e. where a 4G and/or 5G type coverage would be insufficient using prior art techniques.

Although the external television aerial 2 was originally designed for the reception of television channels at UHF frequencies, typically between 450 MHz and 960 MHz, it can advantageously be used in particular for the reception of LTE and/or 5G signals, according to the principle of the invention.

In France, the mobile operators operate in the LTE/5G frequency bands between 703 MHz and 862 MHz.

For example, in France, in the LTE/5G n°20 band, a spectrum of 20 MHz is allocated in the frequency band between 708 MHz and 718 MHz on the uplink and in the frequency band between 763 MHz and 773 MHz on the downlink. In the LTE/5G n°28 band, an additional spectrum of 20 MHz is allocated in the frequency band between 811 MHz and 821 MHz on the downlink and in the frequency band between 852 MHz and 862 MHz on the uplink.

Thus, in France, the UHF frequency bands used on the downlink for the LTE/5G communications are fully comprised in the bandwidth of the external television aerial 2 in reception.

In general, the LTE frequency band is any E-UTRA operational frequency band according to the 3GPP specifications. All or part of the frequency bands used according to the LTE standard can also be used for the 5G standard.

At a regional level, the deployments use a subset of these operational frequency bands for which operating licenses are granted. In the scope of the present invention, an LTE/5G frequency band refers to any frequency band belonging to a commercial LTE/5G network in a given country. When frequency transpositions or conversions are considered in the scope of the present invention, they are considered to be made to other LTE/5G frequency bands held by the same mobile-radio operator or to an open (i.e. unlicensed) frequency band, such as a 2.4 GHz or 5 GHz Wi-Fi frequency band.

Hereafter, the downlink will refer to the communication link between the base station 1.1 and the terminal 4, i.e. when the signal is emitted by the base station and received by the terminal (i.e. the signal goes down from the base station to the terminal).

Conversely, the uplink will be the communication link from the terminal 4 to the base station 1.2. Depending on the embodiment considered, the uplink may therefore designate on the one hand the communication link from the end-user terminal 4 directly to the base station 1.2, or on the other hand the link from the terminal to the processing module and the link from the processing module to the base station 1.2 (i.e. in all cases, the uplink designates that the signal "goes up" from the terminal to the base station).

Hereafter, we will refer to a mobile-radio signal (or mobile signal) as any radiofrequency signal emitted according to a mobile telephone standard, such as GSM (Global System for Mobile Communication), UMTS (Universal Mobile Telecommunications System), LTE (Long Term Evolution) or 5G (5th Generation).

In the following, the term radiofrequency signal will be used to refer to any radio signal, regardless of the carrier frequency and the format of the signal. In this sense, a mobile-radio signal is a particular radiofrequency signal. In this description, we consider the special case where the mobile-radio signal is a signal compliant with the LTE and/or 5G standard.

The system 100 according to the invention further comprises a wired communication link 5 connecting the external television aerial 2 to a processing module of radiofrequency signals 6 installed inside the house or the building 3. This link is suited to transmit television signals and mobile-radio signals in the reception band of the external television aerial 2.

In the present embodiment, this wired communication link 5 is a coaxial cable, for example a cable referenced RG-6, commonly used to connect the television aerials to set-top boxes.

In other embodiments, the wired communication link 5 may be constituted by an optical tunnel, i.e. an optical fiber link comprising at each of its ends optoelectronic converters suited to convert a radio signal into an optical signal or vice versa.

The optical fiber is particularly well suited to limit the transmission losses, in particular when the distance between the external TV aerial 2 and the processing module 6 is high.

The optical fiber is also advantageous in the case where the number of processing modules connected to the external TV aerial 2 is high, for example in the case of a building comprising a plurality of apartments, within which a mobile-radio connectivity is to be provided according to the principle of the invention.

The optical fiber also provides immunity to radiofrequency interferences allowing for higher signal quality compared to using a coaxial cable.

Regardless of the nature of the wired communication link 5 used, it provides an improved transmission channel compared to the radio channel conventionally used to transmit the LTE or 5G signal inside the building 3. In particular, the wired communication link 5 allows to achieve reduced loss and noise levels compared to a conventional LTE or 5G transmission channel.

Thus, the wired communication link 5 is a second improvement factor to optimize the quality of the LTE and/or 5G signal to be broadcast inside the building, resulting in maximizing the transmission rates for the terminal 4 located inside the building 3.

The use of an external television aerial 2 of the Yagi or Log-periodic type in combination with a wired communication link 5, for example based on coaxial cable as described above, advantageously allows the link budget between the nearest base station 1.1 and the terminal 4 to be increased by approximately 30 dB, compared to the conventional case of reception of an LTE or 5G signal in a conventional urban environment. This 30 dB gain corresponds to a multiplication factor of 1000, allowing substantial increases in transmission rates compared to the prior art solutions.

As an illustrative example, the processing module 6 is a set-top box. In a conventional way, this set-top box, also called TV receiver, is connected to a television set 7, so as to provide the data of the television signals S82 received from the emitting TV station 800, for example according to the DVB-T (Digital Video Broadcasting-Terrestrial) or DVB-T2 (Digital Video Broadcasting-Second Generation Terrestrial) standard.

In an alternative embodiment, the processing module 6 is incorporated in the television set 7 in order to make the system more compact.

The system 100 according to the invention further comprises the terminal 4 located inside the house 3. This indoor space is considered to be confined, as radiofrequency waves, in particular the LTE or 5G signals, have difficulty penetrating inside the house 3 directly from the nearby base station via the conventional radio transmission channel.

On the downlink, the terminal 4 is suitable to receive at least one radiofrequency signal S12 from the processing module 6. On the uplink, the terminal 4 is suitable to transmit at least one radiofrequency signal to the processing module 6 (signal S41) or to the nearest base station 1.2 (signal S'41).

Hereinafter, end user terminal or simply terminal will be referred to as any portable equipment comprising a radio interface for wireless communication at least directly with the processing module 6. In the present embodiment, the terminal is a mobile phone equipped with a Wi-Fi interface and a UMTS and LTE and/or 5G interface.

According to an embodiment of the invention, the processing module 6 comprises an extraction means 6.1 suited to extract at least one mobile-radio signal S12 (e.g. LTE or 5G signal) among the radiofrequency signals S12, S82 received by the external television aerial 2.

In the present embodiment, this extraction means 6.1 is a diplexer capable of extracting the LTE and/or 5G signal among the set of signals received from the external television aerial 2 via the wired communication link 5.

Figure 2:
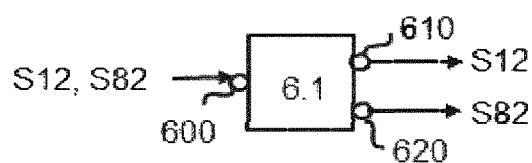
FIG. 2 illustrates a diplexer serving as a means for extracting at least one mobile-radio signal according to a first embodiment.

As illustrated in FIG. 2, the extraction means 6.1 is a diplexer according to a first embodiment.

The diplexer has an input port 600 configured to jointly receive the LTE and/or 5G signal (S12) and the TV signal (S82) picked up by the external television aerial 2. The diplexer 6.1 comprises a first output port 610 configured to provide only the LTE or 5G signal (S12) and comprises a second output port 620 configured to provide only the TV signal (S82). The input port 600 is connected to one end of the wired link 5. The second port 620 is connected to the television set 7. The first output port 610 is connected to an aerial 6.10 suited to emit a mobile-radio signal of LTE or 5G type.

For example, the diplexer 6.1 comprises a radiofrequency coupler allowing to distribute the incident signal over two separate transmission paths within the diplexer. The diplexer also comprises frequency filters on each transmission path suited to the nature of the signal to be extracted on each of the paths. As an illustrative example, one of the paths comprises a first bandpass filter whose passband corresponds to the frequency band of the mobile-radio signal and a second bandpass filter whose passband corresponds to the frequency band of the TV signal. Thus, the diplexer allows the signals received on its input port 600 to be separated into two signals in separate frequency bands, so as to extract on one of the two ports the mobile-radio signals intended to be broadcast inside the building.

In other embodiments, the diplexer can be replaced by a demultiplexer connected to one or more multiplexers, which is particularly useful in the case where the mobile-radio operator has several non-continuous spectral bands for the transmission of the mobile-radio signals (e.g., LTE and/or 5G) on the downlink.

In particular, in the case where the mobile-radio operator emits mobile-radio signals on several frequency bands by means of the base stations, it can be provided for the processing module to retransmit all of these signals to the terminal 4 inside the building.

Figure 3:
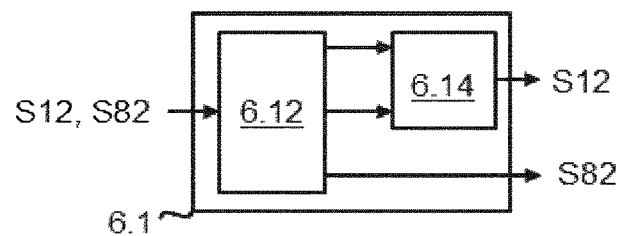
FIG. 3 illustrates an example of a means for extracting at least one mobile-radio signal according to a second embodiment.

According to a second embodiment as illustrated in FIG. 3, the extraction means 6.1 comprise a triplexer (i.e., a 1:3 demultiplexer) 6.12 associated with a diplexer 6.14.

The triplexer 6.12 comprises an input port suited to jointly receive a television signal S82, a mobile-radio signal S12, for example of the 4G type comprising a first frequency band between 763 MHz and 773 MHz and a second frequency band between 811 MHz and 821 MHz.

The triplexer 6.12 also comprises three output ports. The triplexer is configured such that the first and second bands of the mobile-radio signal S12 are provided on first and second output ports of the triplexer respectively, while the television signal S82 is provided on a third output port of the triplexer for the television set 7.

According to this second embodiment, a diplexer 6.14 is connected to the triplexer as described in FIG. 2 but with the difference that it is mounted in "reverse", i.e. it is connected to the first and second output ports of the triplexer 6.12, so as to provide on a same output port the first and second frequency bands 763-773 MHz and 811-821 MHz.

More generally, the extraction means 6.1 are configured to receive on an input port a plurality of TV signals belonging to separate TV frequency bands and a plurality of 4G and/or 5G signals belonging to separate mobile-radiofrequency bands. The extraction means are also configured to provide on a first output port all or part of the plurality of 4G and/or 5G signals and on a second output port all or part of the plurality of TV signals.

Figure 4:
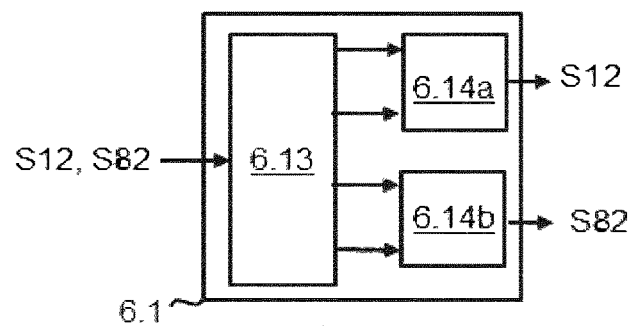
FIG. 4 illustrates an example of a means for extracting at least one mobile-radio signal according to a third embodiment.

FIG. 4 illustrates a third embodiment of the extraction means comprising a quadplexer 6.13 and two diplexers 6.14*a*, 6.14*b*. The quadplexer comprises an input port for receiving the mobile-radio signals and the television signals. The quadplexer also comprises four output ports, two of which are suited to extract the mobile-radio signals while the other two ports are suited to extract the television signals. The two diplexers 6.14*a*, 6.14*b* are of the same type as the one 6.14 described with reference to FIG. 3.

Figure 5:
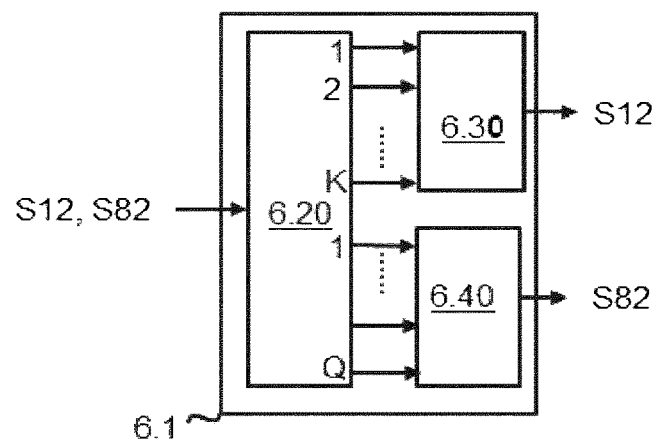
FIG. 5 illustrates a generalized example of a means for extracting at least one mobile-radio signal according to the third embodiment.

FIG. 5 illustrates a generalization of the third embodiment previously described with reference to FIG. 4.

According to this generalized embodiment, the extraction means 6.1 comprise: —a splitting stage 6.20 comprising a demultiplexer 1:(K+Q) having one input port and K+Q output ports, e.g. a quadplexer (K+Q=4) or a triplexer (K+Q=3), the splitting stage allowing the signals received by the external aerial 2 to be frequentially split on the K+Q output ports; and a combining stage connected to the splitting stage. The combining stage including a first multiplexer 6.30 with K inputs and 1 output (K:1) for outputting all or part of the plurality of 4G and/or 5G signals and a second multiplexer 6.40 with Q inputs and 1 output (Q:1) for outputting all or part of the plurality of TV signals.

Each input port of the combining stage 6.30, 6.40 is connected to a separate output port of the splitting stage 6.20, so that several signals received from the external aerial can be frequentially combined on a single output port of the combining stage.

In the particular case where K=2 and Q=2, the splitting stage consists of a quadplexer (1:4) and the combining stage comprises two diplexers (2:1) corresponding to the third embodiment shown in FIG. 4. The two diplexers are mounted in "reverse", i.e. as described above with reference to FIG. 3.

Whatever the embodiment considered, the extraction means 6.1 are configured to extract, on the one hand, the mobile-radio signals of the 4G and/or 5G type, for example on a frequency band between 790 MHz and 862 MHz, and, on the other hand, the television signals for example, on a frequency band between 450 MHz and 790 MHz. This extraction is carried out by means of bandpass filters suited to the frequency bands concerned.

The frequency bands for the mobile-radio signals are separate from the frequency bands for the television signals and these bands do not overlap, although they may be discontinuous.

The alternative embodiments described with reference to FIGS. 2, 3, 4 and 5 are given as illustrative examples. Obviously, any other alternative embodiment may be considered within the scope of the present invention to adapt to the future television channel and/or 4G and/or 5G communication channel allocation plans, in particular in the case where the television and/or communication channels are distributed in discontinuous frequency sub-bands.

Figure 6A:
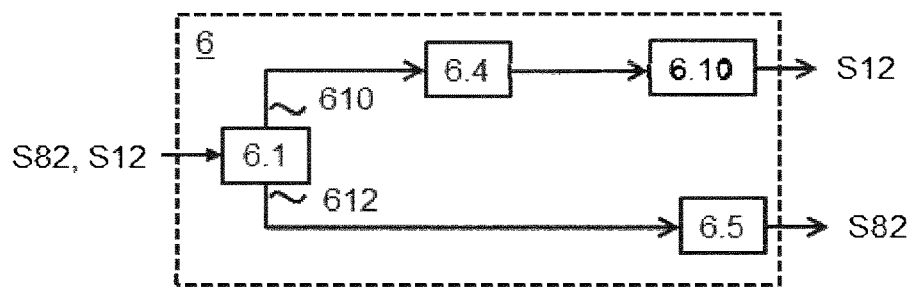
FIGS. 6a-6c illustrate in schematic block diagram form a processing device according to three embodiments of the invention for a downlink communication.

FIG. 6a shows schematically the architecture of the processing module according to a first embodiment, according to which the processing module 6 acts as a radio repeater, intended to retransmit the 4G and/or 5G signal (S12) received from the base station 1.1 to the terminal 4.

According to an embodiment of the invention, the processing module 6 comprises a diplexer 6.1 as described with reference to FIG. 2 and an aerial 6.10 suited to emit the LTE and/or 5G signal (S12) provided on the first output port 610 of the diplexer 6.1.

For example, the diplexer 6.1 is configured to direct signals in a frequency band between 763 MHz and 773 MHz or between 811 MHz and 821 MHz to its first output port 610.

The television signal received on the second output port 612 of the diplexer 6.1 is intended for the television set 7. This signal can be processed (e.g. amplified) by a processing submodule 6.5.

Optionally, the processing module 6 further comprises a first amplifying stage 6.4 including at least one power amplifier. For example, the amplifying stage 6.4 is connected to the first output port 610 of the diplexer 6.1 and to the input port of the aerial 6.10.

Advantageously, the power amplifier is configured to increase the power of the LTE and/or 5G signal to be emitted by the aerial 6.10 within the confined space, so as to improve the 4G and/or 5G coverage and thus contribute to increase the transmission rate. The processing module 6 is configured in such a way that the value of the radiated power at the output of the aerial 6.10 of the processing module 6, in particular the maximum value, complies with the current LTE and 5G standard, taking into account the gain of the aerial 6.10. In general, several amplifying stages, in particular based on low-noise or conventional amplifiers, may be provided at different levels within the processing module, depending on the desired design, the frequency response of the components used and the frequency band considered.

According to this first embodiment, the processing module 6 is suited to "repeat" the LTE and/or 5G signal received from the external television aerial 2. In this case, the processing module 6 acts as an active repeater (signal booster). In the absence of amplification (e.g. zero gain or absence of the amplifying stage 6.4), the processing module 6 acts as a passive repeater.

Figure 6B:
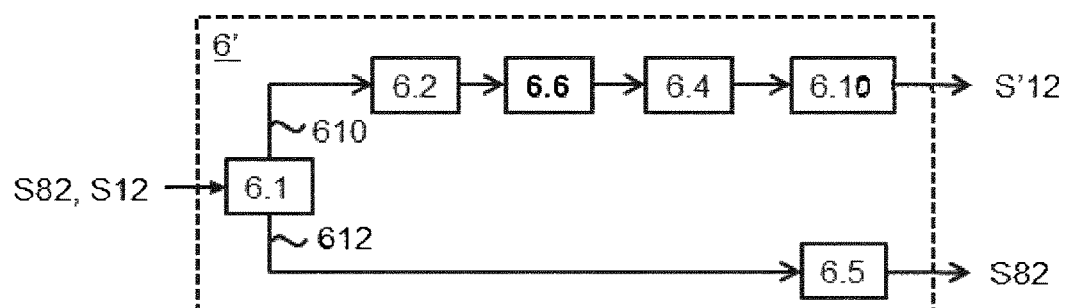

FIG. 6b shows schematically the architecture of the processing module according to a second embodiment, according to which the processing module 6' is configured to provide at least one frequency-transposed signal, possibly amplified.

In this case, the processing module 6' comprises frequency transposition means or frequency conversion sub-module 6.6. For example, this frequency conversion sub-module 6.6 comprises a radiofrequency mixer, a local oscillator and optionally a filter suited to remove the unwanted frequency components generated at the output of the mixer.

Advantageously, the frequency transposition module 6.6 allows the LTE or 5G signal (S12) received from the external television aerial 2 (i.e. on the first output port 610 of the diplexer 6.1) to be transposed into a different frequency band than the received LTE or 5G signal.

For example, the transposition module 6.6 is configured to transpose the LTE signal received in the LTE band n°20 (i.e. between 708 MHz and 718 MHz) to the LTE band n°7 in a 10 MHz channel (i.e. between 2620 MHz and 2690 MHz). The transposition of the received LTE signal to a higher frequency band is particularly advantageous since the higher frequencies (e.g. 2.620-2.690 GHz) are likely to generate less interference than lower frequencies (e.g. 708-718 MHz).

The frequency-transposed LTE signal will be referred to as S'12.

Optionally, the processing module 6' further comprises a pre-amplifying stage 6.2 including at least one low noise amplifier. The pre-amplifying stage 6.2 is connected to the first port 610 of the diplexer 6.1 and to the input of the frequency transposition module 6.6.

In general, several amplifying stages, based in particular on low-noise and/or conventional amplifiers, may be provided at different levels within the processing module, depending on the desired design, the frequency response of the components used and the frequency band considered.

The pre-amplification is advantageously applied before proceeding with the frequency transposition. Thus, the low noise amplifier is configured to minimize the signal to noise ratio of the transposed LTE and/or 5G signal S'12 intended to be emitted by the aerial 6.10 within the confined space, taking into account the performance of the mixer for the frequency conversion.

Thus, the processing module 6' can advantageously broadcast the LTE or 5G signal (S'12) on a frequency band more suitable for an indoor transmission, so as to maximize the transmission rate and reduce the radiofrequency interferences.

The choice of the frequency at which the LTE or 5G signal (S'12) is retransmitted inside the house can take into account the reception accounting of the mobile terminals. For example, the frequency to which the so-called transposition frequency is transposed is predetermined taking into account the propagation conditions of the radio channel in the confined space.

Optionally, the frequency transposition sub-module 6.6 may be configured to determine the transposition frequency dynamically, in particular as a function of the radio transmission channel conditions measured in real time. The transmission channel can be characterized in real time using measurement techniques conventionally used in the radiofrequency communication systems.

Figure 6C:
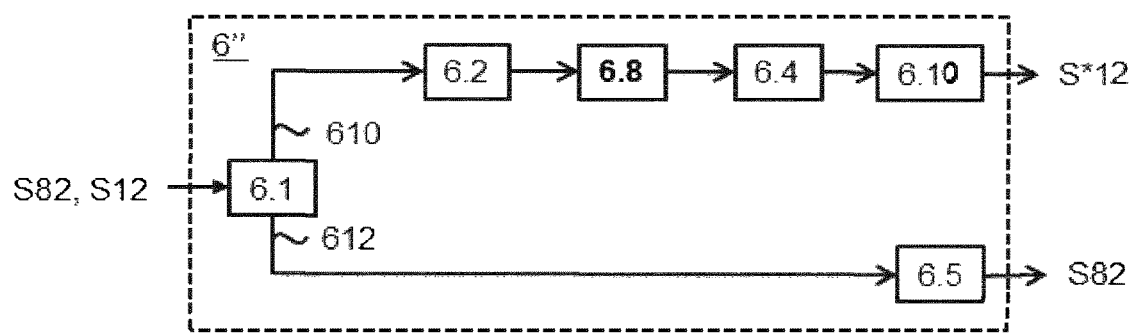

FIG. 6c schematically represents the architecture of the processing module according to a third embodiment, according to which the processing module 6" is configured to convert the format of the mobile-radio signal S12 received from the external television aerial 2, according to another standard (i.e. different from that of the received signal S12).

For example, the module is suited to convert an LTE signal into a Wi-Fi signal. The format conversion may also include a frequency transposition to another 5G frequency band, for example to a millimeter frequency band (e.g. included in the 30-70 GHz range).

The signal thus converted will be designated S*__12.

In this case, the processing module 6" corresponds to the one described according to the second embodiment with reference to FIG. 6b above, but additionally comprises a conversion sub-module 6.8 configured to convert the format of the received LTE and/or 5G signal, for example into a signal converted according to the Wi-Fi standard. In this case, the conversion sub-module 6.8 implements the frequency transposition sub-module 6.6, as described with reference to FIG. 6b.

Preferably, the conversion sub-module 6.8 is implemented, at least partially, by a software radio or software-defined radio module. In particular, the processing module is a LTE/5G mobile-radio network equipment (i.e. LTE/5G User Equipment) such as a LTE/5G modem.

In one embodiment, the internal aerial 6.10 can be integrated into the software radio module to make it more compact. The software radio module can also be suited to implement all or part of the operations on the received LTE and/or 5G signal, such as the amplification, the analog-to-digital and digital-to-analog conversion, the digital processing of the signal such as e.g. modulation/demodulation, the Fast Fourier Transform FFT or its inverse (Inverse Fast Fourier Transform IFFT), the insertion and/or the elimination of the cyclic prefixes, the error correction, the encryption/decryption, the network routing including the frequency transposition.

The software radio module can be easily configured to convert the LTE and/or 5G mobile-radio signal (S12) received from the external television aerial 2 to a Wi-Fi type signal (S*__12) at a higher frequency (e.g. 2.4 GHz or 60 GHz, the latter being a millimeter frequency where the Wi-Fi is known as WiGig) than the received LTE and/or 5G signal (S12). The converted signal is particularly well suited for indoor wireless transmission with mobile terminals, such as mobile phones, tablets and connected objects. In the case of Wi-Fi, the software radio module comprises, for example, a set of electronic chips configured to operate according to one or more Wi-Fi standards.

Thus, the processing module 6" acts as a Wi-Fi access point capable of providing a Wi-Fi coverage inside the building from 4G and/or 5G signals received from the external television aerial 2.

The embodiments according to FIGS. 6a, 6b, 6c have been described above in the case where the extraction means 6.1 of the mobile-radio signals are constituted by a diplexer according to the first embodiment and remain valid for any other embodiment of the extraction means, in particular those described with reference to FIGS. 3, 4 and 5.

According to another embodiment of the invention, the processing module is configured to communicate according to MIMO (Multiple Input Multiple Output), SIMO (Single Input Multiple Output) or MISO (Multiple Input Single Output) type transmission technologies.

For example, the processing module 6', 6" is implemented according to the SDR technology, so that all the modifications required to adapt to the relevant transmission technology (MIMO, SIMO, MISO) can be realized in software form, without the need to adapt the processing module in hardware.

According to a first configuration called SIMO, the external television aerial 2 receives the same data emitted, in a redundant manner, by a plurality of aerials that may be located on different base stations. This first configuration, called SIMO, has at least the following advantages.

First, the redundancy at the level of the coding and the processing is implemented by the emitter rather than the receiver. Thus, when the processing module 6 acts as a repeater with or without frequency transposition, the load on the battery of the terminal is reduced due to a lower processing level, thus allowing to optimize the lifetime of the battery. The realization of a processing by the processing module at the software level according to the SDR technology also allows to optimize the power consumption of the processing module without applying any changes on the hardware side.

Secondly, since the propagation conditions are different from those of the conventional LTE configurations, interference from neighboring base stations can be drastically reduced.

It should be noted that, in the case where the emitting aerials are located on different base stations, a centralized control unit is required to coordinate or program the emissions. Such centralized control is possible, for example with a Cloud-RAN network architecture. In this case, the base stations can be LTE (4G) type, NR (5G) type or a combination of both.

In a second configuration, known as SIMO (or reception diversity), several external television aerials receive several versions of a same signal emitted by a single transmitting aerial of a base station. This configuration advantageously allows the receivers to receive signals from a plurality of independent sources to combat the fading effects, which are more pronounced when the path is not direct for the signals emitted on the downlink. In these conditions, known as Non Line of Sight, the signals are attenuated due to multipaths caused in particular by multiple reflections.

The SIMO configuration has the advantage of being easy to implement but with the disadvantage of requiring a processing at the receiver level. Despite this disadvantage, this configuration is still satisfactory for many applications. When the receiver is located in a terminal such as a mobile phone, the level of processing may be limited by the size, the cost and the capacity of the battery. Therefore, in some embodiments, it is advantageous to perform this processing at the software level through the use of the SDR technology.

In a third configuration, called MIMO, several external aerials receive signals emitted by several emission aerials. This configuration is used to jointly improve the robustness of the channel and its flow rate. Significant performance improvements can be made but will usually require an additional processing cost at the level of the processing module (SDR) or at the level of the terminal.

In general, as described above, as long as the processing module 6', 6" is implemented in software form, for example according to the SDR technology, no hardware changes are required within the processing module.

Figure 7A:
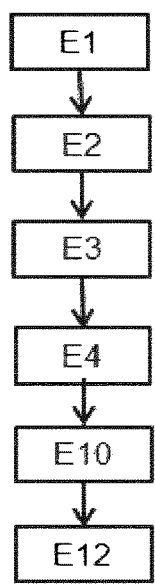
FIGS. 7a-7c schematically illustrate the communication method according to three embodiments of the invention for a downlink communication.

FIG. 7*a* represents schematically, the communication method on the downlink, according to the first embodiment of the invention to provide a 4G and/or 5G coverage inside a house (or confined space) without frequency transposition.

During a reception step E1, the external television aerial 2 receives in a UHF frequency band, for example between 450 MHz and 960 MHz, a plurality of radiofrequency signals comprising, on the one hand, at least one mobile-radio signal S12 emitted by a base station 1.1 of the mobile-radio network in accordance with the LTE or 5G standard, and comprising, on the other hand, a television signal S82 emitted by the emitting TV station 800.

During a transmission step E2, the plurality of radiofrequency signals S82, S12 received by the external television aerial 2 is transmitted between the external television aerial 2 and the module for processing said radiofrequency signals located within the confined space. This transmission is carried out via the wired communication link 5, for example a coaxial cable as previously described with reference to FIG. 1.

During an extraction step E3, the processing module extracts the 4G and/or 5G mobile-radio signal from said plurality of signals. For example, this extraction is performed by a device as described with reference to FIG. 2, 3, 4 or 5, or by any other extraction means suited to split the mobile-radio signals S12 from the television signals S82.

During an optional amplification step E4, the processing module 6 amplifies the 4G and/or 5G mobile-radio signal extracted during the extraction step E3. For example, this amplification is performed by the amplifying stage 6.4. Other amplifying stages may be provided as described above.

During a broadcasting step E10, the processing module broadcasts the mobile-radio signal extracted during the extraction step into the confined space. For this purpose, the aerial 6.10 radiates the extracted and possibly amplified mobile-radio signal.

During a reception step E12, the signal broadcast by the processing module 6 during the broadcasting step E10 is received by the terminal 4. Thus, the LTE and/or 5G signal emitted by the base station 1.1 is received inside the building 3 under good conditions (e.g. with a high signal-to-noise ratio) compared to the case where the LTE and/or 5G signal would be received via the conventional radio channel (i.e. directly by the terminal aerial without the intermediary of the external television aerial 2).

On the downlink (i.e. from the base station 1.1 to the terminal 4), the broadcasting by the processing module 6 of the mobile-radio signal received from the base station 1.1 by the external television aerial 2 advantageously allows to improve the connectivity to the mobile-radio network for a terminal 4 located inside the confined space. Thus, a good 4G and/or 5G mobile-radio connectivity can be provided within the confined space.

Figure 7B:
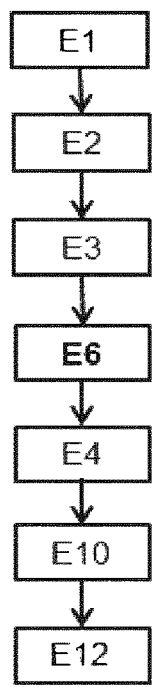

FIG. 7*b* schematically represents the communication method on the downlink, according to the second embodiment of the invention, for providing a 4G and/or 5G mobile-radio coverage within the confined space by implementing a frequency transposition.

According to this second embodiment, the method further comprises, with respect to the first embodiment according to FIG. 7*a*, between the extraction step E3 and the broadcasting step E10, a frequency transposition step E6, according to which the extracted 4G and/or 5G mobile-radio signal is transposed to a frequency different from that on which said mobile-radio signal was received, so as to provide at least one frequency-transposed signal, said transposition step being carried out by said processing module 6' as described with reference to FIG. 6*b*.

The frequency transposition (or conversion) advantageously allows to transpose the mobile-radio signal into another frequency band, for example among the frequency bands allocated to the 4G. Steps E1, E2, E3, E10 and E12 already correspond to those already described with reference to FIG. 7*a*.

Figure 7C:
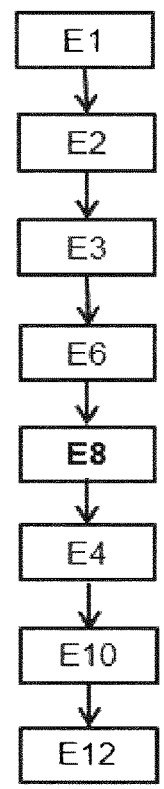

FIG. 7*c* schematically represents the communication method on the downlink, according to the third embodiment of the invention, for providing a Wi-Fi coverage inside the confined space with frequency transposition and format conversion from the received 4G or 5G signal.

According to this third embodiment, the method further comprises, with respect to the second embodiment described with reference to FIG. 7*b*, between the extraction step E3 and the broadcasting step E10, a conversion step E8, during which said at least one extracted 4G mobile-radio signal is converted according to the Wi-Fi standard, so as to provide at least one signal converted according to the Wi-Fi standard, said conversion step being carried out by said processing module 6" as described with reference to FIG. 6*c*.

In this way, the radio coverage can be suited according to the preferences or the communication capabilities of the terminal 4 located in the confined space. In particular, a wireless coverage of the Wi-Fi type, which is generally more suitable for the indoor communications, can advantageously be provided to the terminals from the mobile-radio signals received according to the LTE and/or 5G standard via the external television aerial 2.

Optionally, the method further comprises, between the extraction step E3 and the diffusion step E10, the amplification step E4, during which the converted signal is amplified by said processing module 6" and in particular by the amplifying stage 6.4.

The local amplification step of the mobile-radio signal within the confined space before its broadcasting allows advantageously to improve the quality of the transmission (e.g. increased signal-to-noise ratio) to reach higher transmission rates.

An optional pre-amplification step may be performed prior to the frequency transposition step E6 and/or the conversion step E8 according to the methods described with reference to FIGS. 7*b* and 7*c*. Advantageously, a low-noise amplifier can be used to optimize the signal-to-noise ratio of the transposed S'12 or converted S***12 signal.

Figure 8:
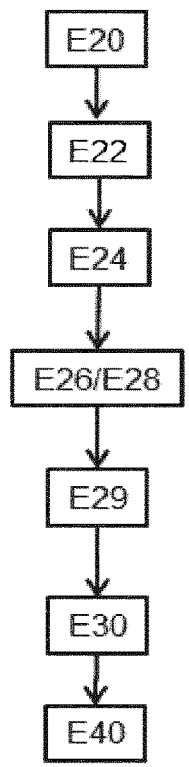
FIG. 8 schematically illustrates a particular embodiment of the communication method for an uplink communication.

The communication method according to the invention will now be described with reference to FIG. 8, in the context of a communication on the uplink according to a particular embodiment, to allow a signal emitted by the terminal 4 inside the building 3 to be received by a base station 1.2 under good transmission conditions so as to improve the transmission rate.

The communication method comprises a step of emitting E20 a radiofrequency signal S'41 from the terminal 4 to the base station 1.2.

In this example, a communication scheme is considered in which the base station 1.2 used on the uplink is different from the base station 1.1 used on the downlink. This communication scheme can be managed by the dual connectivity mode as defined in the 3GPP TS 36.300 version 13.2.0 Release 13 standard for the LTE (4G) or 3GPP TS 37.340 standard for NR (5G) including the interoperability with the LTE, and/or by implementing a centralized network architecture such as C-RAN (Cloud Radio Access Network).

The dual connectivity mode can also be used to allow the terminal 4 to connect simultaneously to both base stations 1.1 and 1.2, by implementing a channel aggregation function by the terminal 4. Thus, the terminal 4 can also receive a second signal on the downlink, this second signal coming from the second base station 1.2 used on the uplink.

In case the radiofrequency signal is a mobile-radio signal S'41 emitted according to the LTE or 5G standard, in a frequency band compatible with the operation of the base station 1.2, no format conversion or frequency transposition is required.

In this case, the mobile-radio signal S'41 is transmitted directly from the terminal 4 to the base station 1.2 via the 4G/5G radio transmission channel.

The signal is received by the base station 1.2 during a reception step E40, in a conventional manner, i.e. without involving the system according to the invention.

Alternatively, the mobile-radio signal (e.g. 4G/5G, WiGig, Wi-Fi) emitted by the terminal 4 is intercepted by the processing module according to the invention during an interception step E22. The intercepted signal is sent by the processing module during a sending step E30.

Optionally, the method comprises before the sending step E30, a frequency transposition step E26 to transpose the intercepted signal to a frequency different from that of the intercepted signal and/or a format conversion step E28 to convert the format of the intercepted signal so as to provide a signal conforming to the 4G/5G standard.

Optionally, the intercepted signal and/or the frequency-transposed signal or the converted signal is amplified during one or more amplification steps (steps E24, E29).

The processed signal is then sent by the processing module to the base station by means of an LTE/5G aerial.

Three particular embodiments of the processing module according to the invention will now be described with reference to FIGS. 9, 10 and 11.

Figure 9:
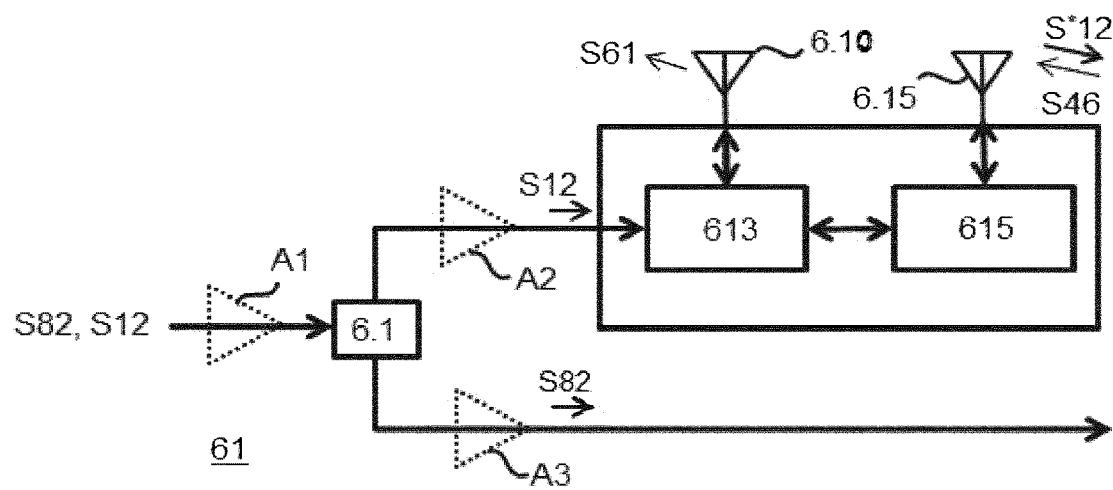
FIG. 9 schematically illustrates a first embodiment of the processing module according to the invention.

FIG. 9 illustrates a first particular embodiment of the processing module according to the invention, suited for domestic use (i.e. intended to be installed in private housing).

According to this first embodiment, the processing module 61 comprises a mobile-radio modem 613 (e.g. LTE and/or 5G), a radiofrequency router (e.g. Wi-Fi) and at least one wireless access point 615 (e.g. Wi-Fi). The one or more wireless access points each comprise at least one aerial 6.15, for example of the Wi-Fi type.

The LTE/5G modem is suitable to communicate with the mobile-radio network. To this end, the LTE/5G modem comprises slots for receiving one or more physical or virtual SIM (Subscriber Identity Module) cards known as e-SIM (or eUICC for embedded Universal Integrated Circuit Card). Such cards may be implemented directly within the processing module 61 and remotely reprogrammed to easily manage identification data relating to a service to which the user subscribes. Advantageously, the eSIM card also offers the possibility to share information such as phone number and account ID with another SIM (Subscriber Identity Module) card.

The LTE/5G modem is also suitable for communicating with the router and the Wi-Fi access point or points. The modem 613 is connected to at least one aerial 6.10 suited to emit LTE/5G signals. The Wi-Fi router communicates with the Wi-Fi access point or points. If the confined space to be covered is large, several Wi-Fi access points can be connected to the router.

The Wi-Fi router can be included in a Wi-Fi access point. Optionally, the Wi-Fi router and/or the Wi-Fi access point can support the WiGig standard (IEEE 802.11ad) for very high speed connections with the terminal 4.

On the downlink, upon reception of a set comprising at least one mobile-radio signal S12 and at least one television signal S82, the extraction means (e.g. a diplexer or a demultiplexer 1:(M+N) connected to a first multiplexer (M:1) and to a second multiplexer (N:1) as described above) distribute said at least one mobile-radio signal S12 to the LTE/5G modem. This signal S12 is then converted into a signal S*21, for example Wi-Fi, at a frequency within a 2.4 GHz or 5 GHz frequency band, by the Wi-Fi access point before being emitted into the confined space to the terminal 4 of the user.

Optionally, one or more amplifying stages may be provided on the downlink at different levels, e.g. at the input of the extraction means 6.1 (i.e. amplifier A1), between the extraction means 6.1 and the modem 613 (i.e. amplifier A2) and/or at the output of the extraction means 6.1 to the television set (i.e. amplifier A3). In FIG. 9, the amplifiers A1, A2, A3 are shown dotted to indicate their optional nature.

On the uplink, the Wi-Fi access point receives a radiofrequency signal S46, for example of the Wi-Fi type according to the IEEE 802.11b standard emitted by the terminal 4. This signal is converted by the access point into a data stream before being transmitted to the modem 613, which uses this data to create a signal that complies with the LTE/5G standard. The resulting LTE/5G signal (referenced S61) is then emitted via said at least one LTE/5G aerial 6.10 to the base station 1.2. Optionally, one or more amplifying stages can also be provided on the uplink.

Figure 10:
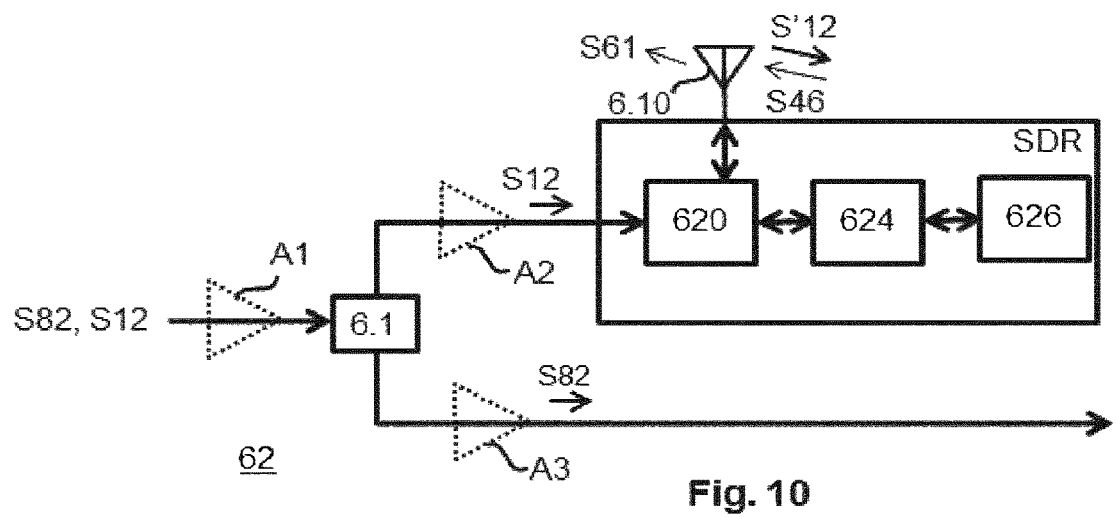
FIG. 10 schematically illustrates a second embodiment of the processing module according to the invention.

FIG. 10 illustrates a second particular embodiment of the processing module according to the invention. This example is particularly well suited to environments or conditions of use that are particularly difficult, i.e. with high traffic loads and/or requiring an interference management.

The processing module 62 according to this second embodiment differs from that 61 of the first embodiment previously described with reference to FIG. 9, in that the assembly constituted by the LTE/5G modem, the Wi-Fi router and the Wi-Fi access points are replaced by a software radio module according to the SDR technology (software radio or software-defined radio: SDR).

Advantageously, the SDR technology allows the processing module according to the invention to be implemented at low cost, in a flexible manner and in accordance with the 3GPP specifications, in particular in the case where the processing module implements all or part of the functionalities of a home base station (e.g. 4G Home eNodeB or 5G Home gNodeB) or a LTE/5G relay. In this case, it is necessary that it is recognized as an official LTE/5G network node (e.g. LTE-A/5G relay, Home eNb/gNb or LTE/5G UE).

In the case where the processing module acts as a home base station, some or all of the conventional functions intended to be implemented by a home base station may be implemented in the software radio module.

According to the embodiments of the present invention, the software radio module may be configured to process at least one mobile-radio signal S12, for example of the LTE/5G type, received on the downlink and/or to process a radiofrequency signal S46, for example of the Wi-Fi or WiGig type, received on the uplink.

As described above, this processing may include amplification, frequency transposition, format conversion or standard conversion functions. In particular, the software radio module can be configured to perform the amplification to a dynamically determined amplification level and/or the frequency transposition to a dynamically determined frequency.

As illustrated in FIG. 10, the software radio module (SRD) comprises a radiofrequency front-end 620, a digital front-end 624, and a signal processing unit 626 comprising a processor. The radiofrequency (RF) front-end unit 620 is connected to at least one aerial 6.10.

For example, the RF front-end unit 620 may comprise a frequency converting stage, an amplifier, a digital-to-analog converter. This converter is connected to the digital front-end unit, which in turn is connected to the signal processing unit. The digital front-end unit may comprise a digital mixer, a digital local oscillator to implement the frequency transposition.

Advantageously, these units are implemented wholly or partly in software form according to the SDR technology.

On the downlink, the mobile-radio signal S12, after having been possibly amplified by the amplifier A2 located at the output of the extraction means 6.1, is received by the radiofrequency front-end unit 620 which converts the signal into digital form before transmitting it to the digital front-end unit 624 which can call upon the processor of the signal processing unit 626.

On the uplink, the mobile-radio signal S46 received from the terminal 4 via the aerial 6.10 is transmitted after possibly being processed by the digital front-end unit and possibly by the signal processing unit. For example, in the case where the received signal S46 is a Wi-Fi signal, it is converted into a LTE/5G signal referenced S61 intended to be received by the base station 1.2.

The architecture proposed in this second embodiment is relatively expensive but advantageously offers great freedom in processing the signals received on both the uplink and the downlink.

Figure 11:
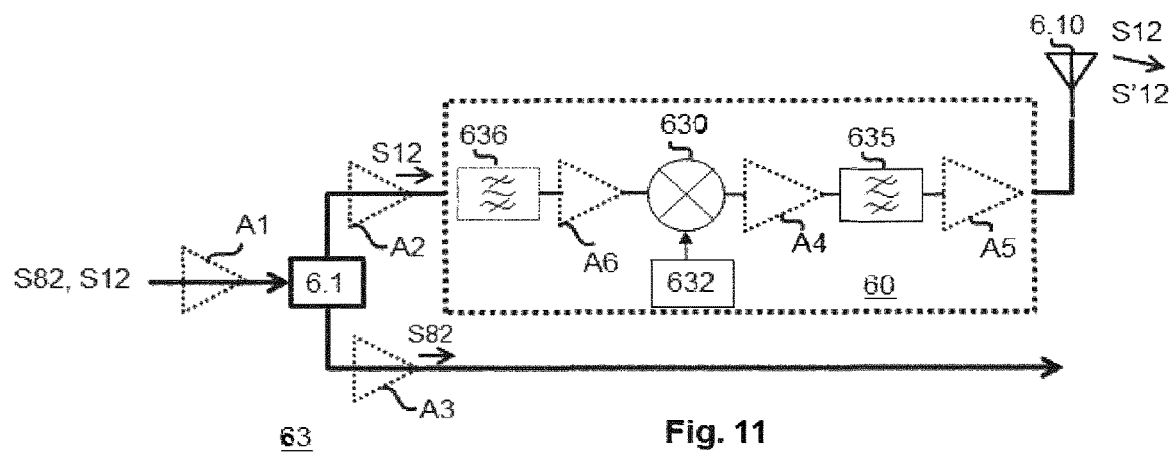
FIG. 11 schematically illustrates a third embodiment of the processing module according to the invention.

FIG. 11 illustrates a third particular embodiment of the processing module according to the invention. This third embodiment is particularly well suited to domestic use, in particular in separate houses.

The processing module 63 according to this embodiment differs from that of the first 61 and second 62 embodiments previously described with reference to FIGS. 9 and 10 respectively, in that it is all analog and does not provide for the implementation of the uplink.

At least, the processing module has the role of retransmitting the mobile-radio signal S12 obtained at the output of the extraction means 6.1. In this case, the function of the module is to relay the mobile-radio signal S12 received by the external television aerial 2.

Optionally, the processing module implements a frequency transposition. To this end, it comprises a frequency transposition analog block 60 comprising at least one mixer 630, one local oscillator 632, one bandpass filter 635. In a known way, the frequency of the mobile-radio signal S12 is modified by means of the mixer 630 fed by a local oscillator signal. The filter 635 allows to remove the unwanted spectral components from the mixing of the received mobile-radio signal S12 and the local oscillator signal by the mixer 630.

Optionally, the processing module further comprises an image rejection filter 636 positioned between the amplifier A2 at the output of the extraction means 6.1 and the mixer 630. This image rejection filter 636 is advantageously used to remove interfering image frequencies that would be present upstream of the mixer 630.

An optional amplifier A6 can be provided between the image rejection filter 636 and the mixer 630. The amplifiers that follow a first amplifying stage can be conventional amplifiers, i.e. not necessarily low noise amplifiers (LNA), without loss of performance. For example, in an amplifier chain, an LNA amplifier is provided at the head of an amplifier chain and followed by conventional amplifiers.

The proposed architecture according to this third embodiment is particularly advantageous in that it is simple and inexpensive to implement.

In all the examples, modes and alternative embodiments described above, only one external television aerial 2 has been considered. However, in the scope of the present invention, the case may also be considered where the 4G/5G mobile-radio signals are received by at least one additional external aerial 8 and dedicated to the reception of these signals.

Advantageously, said at least one dedicated aerial is oriented towards the 4G/5G base station so as to optimize the reception of the 4G/5G signals to contribute to improve the quality of the 4G/5G coverage inside the building according to the principle of the invention. For example, said at least one aerial is installed on the roof of the house in line of sight with one or more base stations.

Figure 12:
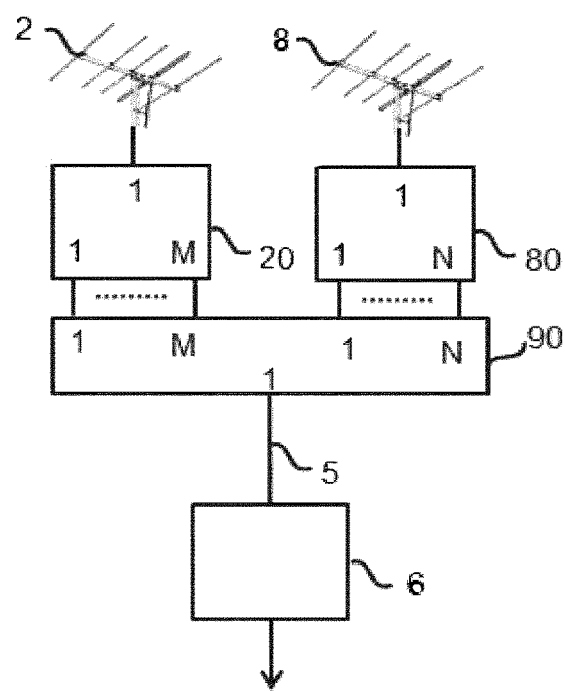
FIG. 12 schematically illustrates an embodiment of the system according to the invention comprising an external aerial dedicated to the reception of mobile-radio signals.

FIG. 12 illustrates a particular embodiment in which the system according to the invention comprises the already described external television aerial 2 and a dedicated external 4G/5G aerial 8 for receiving mobile-radio signals, in particular, for receiving mobile-radio signals in N frequency bands, where N denotes a non-zero natural number.

This dedicated aerial 8 is connected to a first 1:N demultiplexer referenced 80, comprising one input port and N output ports, each output port being suited to provide a signal in a separate 4G/5G frequency band. Thus, the first demultiplexer 80 is used to select from the set of the signals received by the dedicated aerial 8 those received in N 4G/5G frequency bands, where N denotes a non-zero natural number.

Similarly, the external television aerial 2 is connected to a second 1:M demultiplexer referenced 20, comprising one input port and M output ports, each output port being suited to provide a signal in a separate television band. Thus, the second demultiplexer 20 is used to select from the set of the signals received by the external television aerial 2 those received in M television frequency bands, where M denotes a non-zero natural number.

The set of television and 4G/5G signals selected by the second 20 (1:M) and first 80 (1:N) demultiplexers, respectively, are then transmitted over the wired communication link 5 (e.g. coaxial cable) as described above. To this end, the system according to the invention comprises a multiplexer (M+N:1) referenced 90, comprising M+N input ports and one output port, the M and N input ports being connected respectively to the M output ports of the second demultiplexer 20 (1:M) and to the N output ports of the first demultiplexer 80 (1:N) as illustrated in FIG. 12.

In the particular case where N=M=1, the two demultiplexers 20, 80 and the multiplexer 90 are replaced by a single diplexer (2:1) whose two inputs are connected respectively to the external aerial 2 and to the dedicated aerial 8 and whose output is connected to the coaxial cable.

According to another embodiment of the invention, the dedicated external television aerial 2 is mounted on an orientation servo module comprising a motor suited to modify the orientation of the aerial according to parameters, such as the power of the received mobile-radio signal, the load level and/or the traffic of the coverage cell of the cellular radio network in which the aerial is located. These parameters are given as an indication and are not limitative. Other parameters can of course be taken into consideration to optimize the reception of the LTE and/or 5G signal and thus improve the 4G and/or 5G coverage inside the building.

This embodiment is particularly suitable when several external television aerials for a single television set 7 are arranged on the roof of a building. In this case, it is advantageous to dedicate one of the external television aerials to the reception of mobile-radio signals, for example of the LTE type. For example, the second output port 612 of the diplexer 6.1 is not connected to the television set 7. Thus, the processing module 6 is not intended to be connected to a television set but will act as a repeater or home access point as described above.

The invention claimed is:

1. A method of communication between at least one base station of a mobile-radio network and at least one terminal located in a confined space, said method comprising the following steps:
    a) receiving by at least one television aerial external to said confined space, in a UHF frequency band, in particular between 450 MHz and 960 MHz, a plurality of radiofrequency signals comprising, on the one hand, at least one mobile-radio signal emitted by said at least one base station of the mobile-radio network, said plurality of radiofrequency signals comprising on the other hand at least one television signal;
    b) transmitting said plurality of radiofrequency signals, via a wired communication link, between said at least one external television aerial and a processing module of said radiofrequency signals located within said confined space;
    c) extracting said at least one mobile-radio signal by said processing module;
    d) broadcasting said at least one mobile-radio signal extracted by said processing module within the confined space; and
    e) receiving by the terminal said broadcast signal,
    wherein the processing module comprises:
        a radio frequency router;
        at least one wireless access point connected to said radio frequency router; and
        a mobile radio modem is adapted to communicate on the one hand with the mobile radio network and on the other hand with the radio frequency router and said at least one wireless access point, the mobile radio modem being designed to receive at least one physical SIM card or virtual e-SIM card that can be reprogrammed remotely.

2. The method according to claim 1, further comprising, between step c) and step d), a frequency transposition step, according to which said at least one extracted mobile-radio signal is transposed to a frequency different from that at which said mobile-radio signal was received, so as to provide at least one frequency-transposed signal, said transposition step being carried out by said processing module.

3. The method according to claim 2, further comprising, between step c) and step d), a conversion step, during which said at least one extracted mobile-radio signal is converted according to a specific standard so as to provide at least one converted signal, said conversion step being performed by said processing module.

4. The method according to claim 1, further comprising, between step c) and step d), an amplification step during which said at least one extracted mobile-radio signal is amplified by said processing module.

5. The method according to claim 1, further comprising:
    e) a step of emitting a mobile-radio signal by said terminal to at least one base station of the mobile-radio network;
    f) a step of receiving by the base station the radiofrequency signal emitted by the terminal.

6. The method according to claim 1, further comprising:
    g) a step of intercepting by said processing module a radiofrequency signal emitted by said terminal;
    h) a step of emitting, by said processing module, a radiofrequency signal obtained from the radiofrequency signal received from the terminal, to said at least one base station of the mobile-radio network;
    i) a step of receiving by the base station the radiofrequency signal emitted by the processing module.

7. The method according to claim 6, further comprising, between step g) and step h), an amplification step, during which the received radiofrequency signal is amplified by the processing module.

8. The method according to claim 6, further comprising, between step g) and step h), a frequency transposition step, during which the received radiofrequency signal is transposed to a frequency different from that at which the radiofrequency signal was received, said transposition step being carried out by said processing module.

9. The method according to claim 8, further comprising a conversion step, during which the received radiofrequency signal is converted by said processing module according to the LTE or 5G standard.

10. The method according to claim 2, wherein the frequency at which said at least one signal is transposed is dynamically allocated by the processing module.

11. The method according to claim 4, wherein the amplification is carried out dynamically by the processing module.

12. A system for carrying out the method according to claim 1, comprising:
    at least one base station of a mobile-radio network, said at least one base station being able to emit and/or receive mobile-radio signals;
    at least one television aerial external to a confined space, said at least one aerial being able to receive radiofrequency signals in a UHF frequency band, in particular between 450 and 960 MHz;
    a module for processing radiofrequency signals, said processing module being installed in the confined space and comprising an extraction means suited to extract at least one mobile-radio signal among the radiofrequency signals of said UHF frequency band, as well as an aerial suited to emit and/or receive a radiofrequency signal;
    a wired communication link connecting said at least one television aerial external to said processing module;
    at least one terminal capable of receiving or emitting at least one radiofrequency signal respectively from or to said processing module, said at least one terminal being located in the confined space, wherein the processing module comprises:
- a radio frequency router;
- at least one wireless access point connected to said radio frequency router; and
- a mobile radio modem adapted to communicate on the one hand with the mobile radio network and on the other hand with the radio frequency router and said at least one wireless access point, the mobile radio modem being designed to receive at least one physical SIM card or virtual e-SIM card that can be reprogrammed remotely.

13. The system according to claim 12, wherein the extraction means suited to extract at least one mobile-radio signal among the radiofrequency signals of said frequency band is selected from: at least one diplexer, one triplexer, one quadplexer or a combination thereof.

14. The system according to claim 13, wherein said extraction means is a diplexer.

15. The system according to claim 13, wherein said extraction means suited to extract at least one mobile-radio signal among the radiofrequency signals of said frequency band comprises:
- a splitting stage including an input port and Q+K output ports, said splitting stage being configured to frequentially split the signals received from said at least one external aerial on the output ports;
- a combining stage comprising a first component including K input ports and one output port, each input port of said first component being connected to a separate output port of the splitting stage so as to frequentially combine a plurality of signals received from said at least one external aerial on a same output port of the combining stage.

16. The system according to claim 15, wherein the splitting stage comprises a 1:3 triplexer and the combining stage comprises a 2:1 diplexer.

17. The system according to claim 15, wherein the splitting stage comprises a 1:4 quadplexer and the combining stage comprises two 2:1 diplexers.

18. The system according to claim 12, wherein the processing module comprises at least one power amplifier and/or at least one low noise amplifier suited to amplify the mobile-radio signal received from at least one of said base stations.

19. The system according to claim 12, wherein the processing module comprises frequency transposition means suited to provide at least one frequency-transposed signal from said mobile-radio signal received from at least one of said base stations.

20. The system according to claim 18, wherein the processing module further comprises signal processing means configured to convert the mobile-radio signal received from at least one of said base stations to a given standard.

21. The system according to claim 12, wherein the processing module is implemented at least in part according to a software-defined radio technology.

* * * * *